No. 608,985. Patented Aug. 9, 1898.
T. HENNESSY.
APPARATUS FOR PRODUCING ACETYLENE GAS.
(Application filed Sept. 25, 1895. Renewed Oct. 27, 1897.)

(No Model.) 2 Sheets—Sheet 1.

No. 608,985. Patented Aug. 9, 1898.
T. HENNESSY.
APPARATUS FOR PRODUCING ACETYLENE GAS.
(Application filed Sept. 25, 1895. Renewed Oct. 27, 1897.)

(No Model.) 2 Sheets—Sheet 2.

UNITED STATES PATENT OFFICE.

THOMAS HENNESSY, OF EXCELSIOR SPRINGS, MISSOURI.

APPARATUS FOR PRODUCING ACETYLENE GAS.

SPECIFICATION forming part of Letters Patent No. 608,985, dated August 9, 1898.

Application filed September 25, 1895. Renewed October 27, 1897. Serial No. 656,581. (No model.)

*To all whom it may concern:*

Be it known that I, THOMAS HENNESSY, a citizen of the United States, residing at Excelsior Springs, in the county of Clay and State of Missouri, have invented certain new and useful Improvements in Apparatus for Producing Acetylene or other Gas; and I do hereby declare the following to be a full, clear, and exact description of the invention, such as will enable others skilled in the art to which it appertains to make and use the same.

This invention relates to an apparatus for producing acetylene or other gas, and has for its object the provision of mechanical means automatically operative in the production of the gas, so as to give a uniform pressure at all times and also to insure numerous other concurrent advantages which are commonly absent from machines heretofore devised for a similar purpose; and the invention therefore consists, essentially, in the construction, arrangement, and combination of parts, substantially as will be hereinafter described, and then more particularly pointed out in the ensuing claims.

Figure 1:
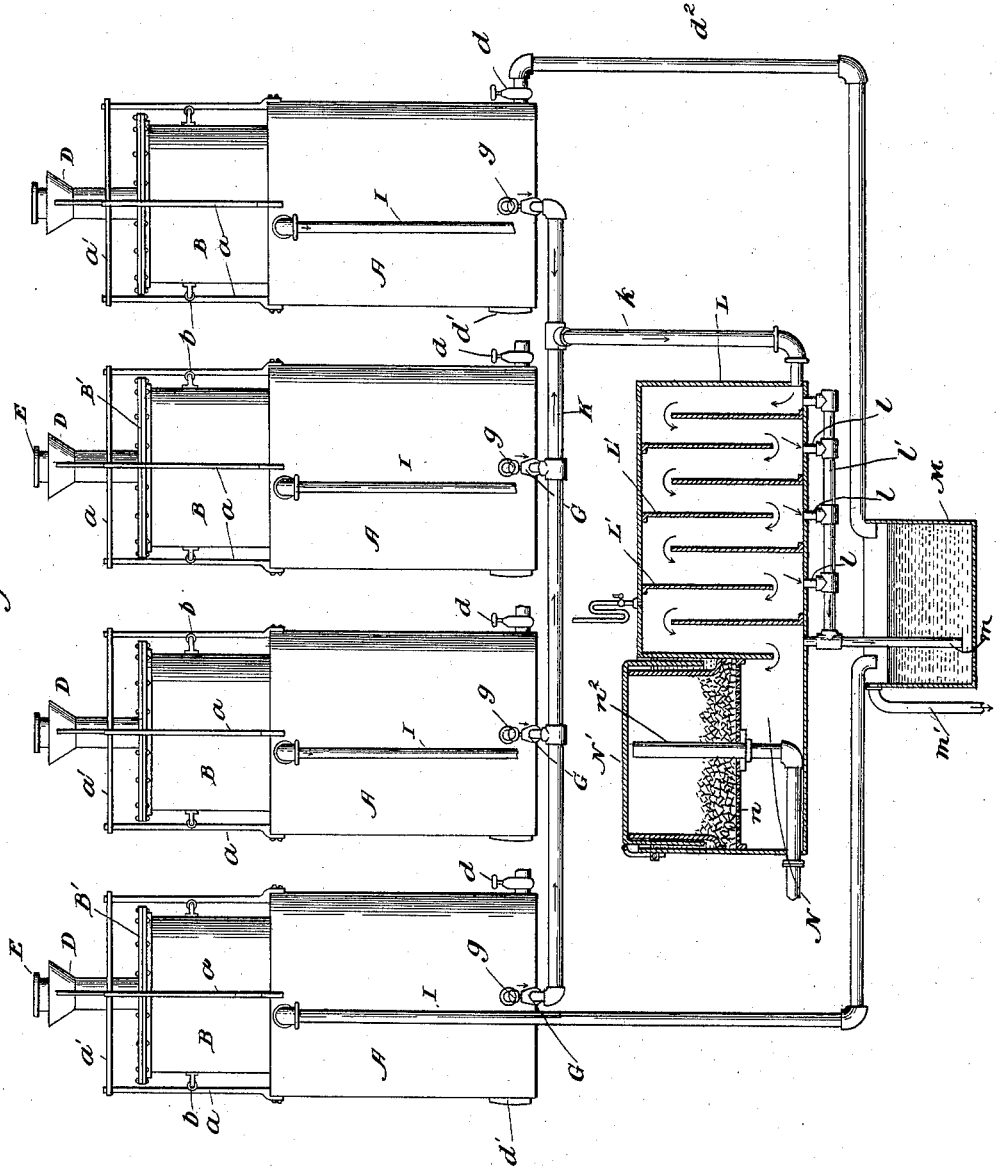
Figure 2:
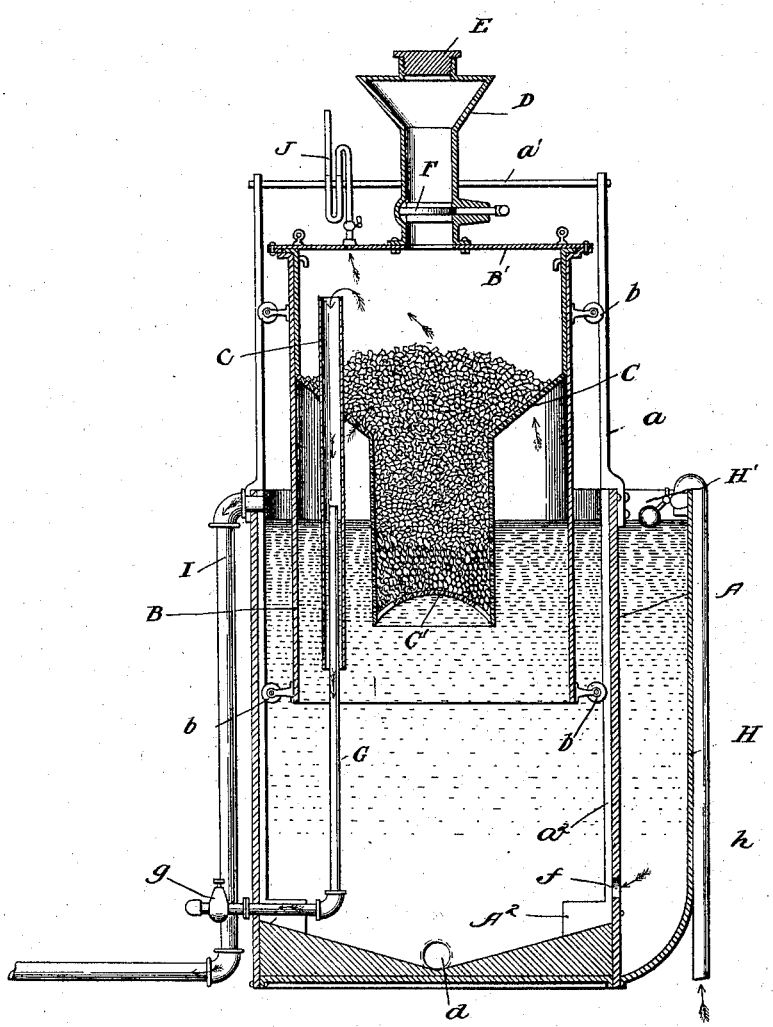
Figure 3:
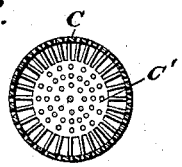

In the annexed drawings, illustrating my invention, Figure 1 is a front elevational view of my improved apparatus for producing acetylene or other gas, said apparatus being shown as consisting of a series of gas-generators, any number of which may be simultaneously employed. Fig. 2 is an enlarged vertical cross-sectional view of one of my improved gas-generators. Fig. 3 is an inverted bottom end view of the inner receptacle, which contains calcium carbid or other substance.

Similar letters of reference indicate corresponding parts throughout all the different figures of the drawings.

A denotes a tank or receptacle of suitable size and shape and adapted to contain water or any other suitable liquid. Situated within the main tank A and vertically movable therein is an inverted receptacle or gas-container B. This gas-container B is maintained in position and is guided in its upward or downward movements by means of a system of vertical guide-rails $a$, which are secured by bolting or other means to the upper edge of the main tank A, as clearly shown in Fig. 2, upon which guide-rails the pulleys $b$, carried by the gas-container B, operate, as shown. The vertical guide-rails $a$ are connected together at the top by means of lattice-girders $a'$. Furthermore, these guide-rails $a$ are located directly above and in line with the guide-rails $a^2$, fastened on the inside of the main tank A. Thus it will be seen that the pulleys or rollers $b$ can easily operate upon the vertical rails $a$ and $a^2$ during the vertical movement of the gas-container B either up or down. The object of breaking the vertical guide-rails into the sections $a$ and $a^2$, which meet at the upper edge of the main tank A, is to render the apparatus more convenient for the handling and packing together of its various parts in transportation.

Within the gas-container B is a receptacle or basket C, the upper part of which is of a proper diameter to fit neatly within the surrounding concentric cylindrical receptacle B, the upper edge of receptacle C being flanged, as shown, to fit down over the upper flanged edge of the receptacle B, while the lower part of the receptacle C has a contracted diameter which is considerably less than the diameter of the upper portion, said lower portion of contracted diameter connecting with the upper portion of larger diameter by the inclined bottom wall, as shown in Fig. 2. The bottom wall of this receptacle is perforated or slotted in some suitable manner.

To the upper flanged edge of the receptacle B is secured the horizontal cover B', which closes the upper end of the receptacle C and operates as a closure for the upper end of the receptacle B. The receptacle or basket C can be constructed of any suitable material, and is for the purpose of containing any solid substance which may be placed therein for the purpose of generating gas. This substance will usually be calcium carbid; but it may obviously be any other solid adapted, when a liquid is brought into contact therewith, to generate gas.

The calcium carbid or other suitable substance is introduced into the receptacle C through the charging-hopper D, which is supported upon the horizontal cover B, and is provided at its upper end with a removable screw-stopper E and at the lower end with the sliding gate-valve F. The hopper D can be filled with calcium carbid by removing the screw-stopper E. After it is filled the screw-stopper will be placed in position. When it is desired to discharge the calcium carbid or other substance from the hopper D into the receptacle C, the operator will manipulate the gate-valve F and allow the calcium carbid to drop down into the receptacle C, where it will occupy the position shown in Fig. 2.

The solid-containing receptacle C is provided with a vertical pipe c, which is rigidly connected thereto, and which extends downward through the gas-container B to within a few inches of the bottom of the latter and upward in the receptacle C to within a short distance from the top thereof. This pipe c has a sliding connection with a vertical outlet-pipe G, which extends upward through the main tank A from a point near the bottom of the latter, and which is used for the purpose of carrying off the generated gas. As the upper end of the pipe G enters the pipe c and as the pipe c slides thereover during the vertical movement of the cylinder B, the connection between the two pipes, although a sliding one, is of a permanent character, so that all the gas that enters the pipe c will pass through it into the pipe G and be carried off thereby to such a point where it may be required for use. The gas-outlet pipe G is provided with the cock g, fixed therein at a point directly outside of the tank and used for the purpose of shutting off or turning on the gas, as may be desired, to control the action of the tank.

J represents a siphon carried by the coverplate B' and communicating with the interior of the receptacle C by means of a cock with which it is provided, said siphon being filled with water to indicate the pressure of the gas which is maintained in the receptacle or holder C, so that at all times the pressure of the gas in the house or building can be readily determined and maintained with uniformity.

It having already been stated that the receptacle C is flanged at its upper end to rest upon the upper flanged edge of the vertically-movable receptacle B, it will be observed that said receptacle C can readily be separated and removed from the holder B by removing the plate B' from the gas-holder B, after which the receptacle C can be lifted out of the holder B to clean or repair the same.

Adjacent to the main tank A is a water-supply tank H, connected to the tank A for the purpose of maintaining the water-level in the tank A, communication being had from the tank H to the tank A through the opening $f$.

A water-supply pipe $h$ enters the tank H at the upper end thereof and is provided with the floating ball-valve H' at the top of the tank H, whereby the admission of water into the tank H is automatically regulated. When the water evaporates in the tank A as the result of the contact of the calcium carbid or other solid with the liquid, thereby generating a gas, the water-level will be lowered, and this will cause the ball-valve H' to open and allow water to flow in again into the tank H and from that to the tank A to replenish the evaporated water and carry the water-level up again to the proper distance.

Although I have herein represented and described an auxiliary automatically-operating water-supply means consisting of the tank H, yet I do not wish to be restricted to the use of an automatic water-supply, as the same is not essential, but the tank A may be, if desired, filled by a bucket or any other utensil to replenish the evaporated water. It is not absolutely essential in my improved gas-generator that the water should be kept at any particular level, since the jointly-moving holder B and receptacle C simply follow in their movements the water-line wherever such line may be kept or maintained. The tank A is provided with an overflow-pipe I, which prevents the water from rising in the tank higher than the point where said pipe is connected. This pipe I, as shown in Fig. 1, runs to the water-seal M and empties into the top thereof, so that whenever the water-level in the main tank A rises unduly high the surplus water will be promptly transferred to the water-seal M.

At the bottom of the main tank A is a gate-valve $d$, which has a pipe $d^2$, connecting it with the water-seal M. Any residiuum or surplus matter formed by the decomposition of the calcium carbid or other material and falling to the bottom of the tank A can be removed through this gate $d$. Opposite to the gate-valve $d$ there is a hand-hole $d'$, which can be removed at any time, if it be found necessary, for the purpose of taking out any accumulation of worthless material from the bottom of the tank A that cannot be forced through the gate-valve $d$ and carried off by means of the pipe $d^2$.

In Fig. 1 I have illustrated four gas-generators, all of the same construction as just described. It will thus be understood that I provide any desired capacity by using the proper number of generators, either one or more. These generators can be made as small or as large as desired. By having a series of small ones and then bringing into action as many of the number as may be required to fulfil the duty demanded in each case I am able to avoid waste, to keep a uniform pressure, and to achieve many other advantages and benefits of great importance. The several gas-outlet pipes G from the several gas-tanks A are all connected to a common distributing-pipe K, as shown in Fig. 1. From the distributing-pipe K a pipe $k$ proceeds to the scrubber L. This scrubber L consists of alternate partitions L', which are connected to the sides of the scrubber and alternately to the top and to the bottom thereof, so that each division of the scrubber is perfectly gas-tight, excepting at the point where an opening is made at the top or at the bottom between the divisions, as shown by the arrows in Fig. 1. From the several divisions of the scrubber L pass out the pipe connections *l l*, that enter the pipe *l'*, communicating with the pipe *m*, that passes into the water-seal M. Hence any accumulation or condensation formed in the different chambers of the scrubber may be carried down to this small seal-tank M, which is filled with water for the purpose of sealing the gas and carrying off any condensation which may form in said scrubber. The seal M has an overflow *m'*, which can be run off or conducted wherever desired.

In the end of the scrubber L is a purifying-chamber N, having therein a horizontal perforated tray *n*, which is placed a few inches above the bottom of the chamber N and is covered with calcium carbid or some other suitable material for taking up the moisture which may be in the gas when it reaches that point before it is distributed through the pipe *n²*, whereby it is carried to the building or other place where it is to be used. The cover N' of the box or chamber N is sealed in lutes, as shown in Fig. 1, which are filled full of water and constitute a part of the wall of the chamber N, so that the gas may be sealed by water, paraffin, or any other suitable liquid, thereby enabling such a connection of the cover N' to be made with its chamber N as will permit said cover to be readily hoisted or lifted to permit a cleaning out of chamber N or a changing of the purifying material on the tray *n*. A high beam or other device can be placed over the series of generators and purifiers and a carriage placed upon the same, with which a differential block may be connected, so that the chambers B C can be removed thereby from the tank A or the cover N' lifted off the purifying-chamber N whenever required.

I will now describe the operation of my improved apparatus for producing acetylene or other gas. The operator will first remove the stopper E and then fill the hopper D with calcium carbid or such other suitable solid substance as may be employed for the purpose in view. When the valve F is opened, the material will fall into the receptacle or basket B, filling the same up to within a few inches of the top. It will be observed that the bottom C' of the receptacle C is preferably made convex, as shown in Fig. 2, and the center portion is preferably perforated, while the rim portion is barred or slotted, as shown in Fig. 3, this being a preferable construction, in order that the residuum formed by the decomposition of the calcium carbid may fall through the slots at the edge of the bottom C' down into the bottom of the tank A. After the receptacle C has been charged with the proper amount of material required the valve F will be closed and the hopper D then again filled with material and the screw E screwed down, so that the receptacle D may be gas-tight at the top, even if the valve F should chance to leak. The operator will now turn on water from the pipe H', which will run into the tank H, and thence through the opening *f* into the tank A, wherein it will rise to the proper level. While this operation is proceeding, the gas-holder B will be at the bottom of the tank A, resting upon the landing-stones A², said stones being arranged for the purpose of preventing the tank from sticking or clogging. As the water rises in the tank A it comes in contact with the calcium carbid which fills the perforated lower portion of the receptacle C, and this contact causes the immediate generation of the gas known as "acetylene" gas. This gas ascends between the walls of the gas-holder B and the receptacle C and passes through the perforated or barred inclined parts of the bottom wall of the upper part of the receptacle C, passing through the calcium carbid at that point, whereby the gas is more thoroughly dried in consequence of its contact with the calcium carbid after leaving the surface of the water, and then passing upward above the calcium carbid to the top of the cylinder B within the upper portion of the receptacle C, which forms a receptacle or holder for the gas. It will also be noted that as the gas which is generated comes again into contact with the calcium carbid in the upper portion of the receptacle C the moisture will not only be taken up, but this contact will result in the generation of more gas. As the pressure in the receptacle C will now be greater than the weight of the same said receptacle C and the gas-holder B will be lifted and guided in their upward movements by the rollers *b* working on the guide-rails *a*. This upward movement of these parts will elevate the calcium carbid above the level of the water, and when the association of the carbid with the water thus ceases the generation of gas will cease temporarily until the mass of calcium carbid again drops into contact with the water. In this explanation I am assuming that the valve *g*, which controls the gas-outlet, is closed, so that there can be no escape of the gas through the outlet-pipe from the upper interior of the receptacle C. Now if the operator opens the valve *g* and allows an outflow of the gas from the receptacle C through the pipe *c* and the outlet-pipe G the pressure in the receptacle C will be reduced. If the supply of gas required to be delivered through the pipe G is large, the buoyancy of the gas-holder B will be reduced by reason of the extra amount of gas required. Said holder B will then descend farther into the water in the tank A immediately upon the release of the pressure which buoys up the receptacles B and C, and in consequence of this lower descent of the carbid a greater amount of the latter will come in contact with the water, thereby increasing the amount of gas generated in the chamber or holder B. If the consumption of gas is partially cut off and less gas flows out through the pipe G, then the pressure will immediately increase in the gas-holder B, and the receptacle C, with its calcium carbid, will again be raised up out of the water, leaving only the necessary amount of carbid exposed to the water as is required to generate the required amount of gas and keep a uniform pressure. When the calcium carbid or other material has all been consumed and no more gas is thrown off, the receptacle B will slide down through the water in the tank A and rest on the landing-stones A², and the apparatus will consequently become temporarily inoperative by reason of the fact that no material is in the receptacle C to be converted. When it is required to operate the apparatus again, it must once more be charged as before.

It will be seen by this description that the apparatus works automatically by the pressure of the gas generated in the gas-container B. As soon as the receptacle C is charged with gas, if no gas is taken off through the pipe G, then the apparatus will remain inoperative, because the calcium carbid will remain out of contact with the water. Hence by means of my present improved generator a uniform pressure of gas can be kept in a house or building at all times equally as well as if the gas appliance were operated from a holder in the usual way where gas is forced through the mains of a city or town. The gas which passes through the pipe $c$ from the gas-container B and receptacle C into the pipe G flows thence through the stop-cock $g$ and through the pipes K and $k$ into the scrubber L up and down through the same, as already explained, for the purpose of drying the gas, and finally the gas passes through the tray $n$ and upward through the calcium carbid thereon, or through any other material which may be placed upon the sieve or tray—such, for instance, as charcoal, sawdust, or any other material having a like drying quality—for the purpose of thoroughly drying the gas before it is delivered to the pipes for consumption. After the gas leaves the material which is upon the tray $n$ it will pass out through the pipe $n^2$ to be delivered wherever required.

Many advantages will accrue from the use of a plurality of generators, as shown in Fig. 1, which are adapted to be operated separately or in a series in order to supply the necessary amount of gas. The advantage of having the generators located in a series may be described as follows: The generators may be made small in size and can be turned on separately, so as to have one or all in use at a time. If six generators were connected together and arranged as shown, two, for instance, could be in operation, while in the other four water could be introduced, the cocks turned off, and as the carbid comes into contact with the water in the several generators the carbid-carrying receptacles will be lifted by the pressure of the gas, so that the carbid would be situated temporarily out of contact with the water. The two generators in use could be operated as long as required, and when desired to charge or clean the same two other generators might be turned on instantly by opening the cocks and the two in use shut off, repaired, cleaned, or anything else done with them as might be desired. The number of generators in series and the number in use can, with such an arrangement, be increased or diminished as required.

The object is to increase the supply of gas with little cost and make the apparatus effective for the production of a large or small amount of gas for such services as may be required.

It will be seen that with such an arrangement it will be impossible for anything to occur whereby the supply of gas will be cut off.

Many changes may be made in the precise construction and exact arrangement of the several mechanical parts of my invention without departing from the legitimate scope of the same, and I reserve the liberty of varying the details as may be required to satisfy different cases.

Having thus described my invention, what I claim as new, and desire to secure by Letters Patent, is—

1. In a gas apparatus, the combination with a main liquid-containing chamber having a supply-tank connected thereto to automatically supply the same with water, of a float-valve automatically controlling the supply of water to said tank, a vertically-movable gas-holder moving on guides within the water-chamber, a perforated receptacle or basket having its upper part adapted to fit snugly in the gas-holder while its lower part is contracted and provided with inclined lateral walls through which the generated gas passes, a hopper located on the gas-holder and controlled by a slide-valve, a vertical pipe rigidly connected to the perforated receptacle, an outlet-pipe telescoping the vertical pipe, and landing-stones at the base of the main receptacle upon which the vertically-movable gas-holder rests when the device is inoperative.

2. In a gas apparatus, the combination with a main liquid-containing chamber having a supply-tank connected thereto to automatically supply the same with water, of a float-valve automatically controlling the supply of water to the said tank, a vertically-movable gas-holder moving on guides within the water-chamber, a perforated receptacle or basket located in the gas-chamber, said basket being provided with inclined lateral walls through which the generated gas passes, a hopper located on the gas-holder for charging the basket, a vertical pipe rigidly connected to the perforated receptacle, an outlet-pipe telescoping the vertical pipe, a scrubber, and a purifying-chamber connected with said scrubber.

In testimony whereof I affix my signature in presence of two witnesses.

THOMAS HENNESSY.

Witnesses:
 J. FRED. KELLEY,
 FRED E. TASKER.